(12) United States Patent
Yamamoto

(10) Patent No.: US 6,967,910 B2
(45) Date of Patent: Nov. 22, 2005

(54) INFORMATION RECORDING APPARATUS AND METHOD FOR CONTROLLING DATA WRITING RATE BASED ON DATA TRANSFER RATE SO AS TO IMPROVE DATA WRITING PERFORMANCE

(75) Inventor: Kazutaka Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 556 days.

(21) Appl. No.: 09/984,231

(22) Filed: Oct. 29, 2001

(65) Prior Publication Data

US 2002/0060961 A1 May 23, 2002

(30) Foreign Application Priority Data

Nov. 21, 2000 (JP) ........................................ 2000-353824

(51) Int. Cl.[7] ................................................ G11B 5/09
(52) U.S. Cl. ................................ 369/47.11; 369/47.28; 369/47.38
(58) Field of Search ........................... 369/47.11, 47.28, 369/47.38, 47.12, 47.36

(56) References Cited

U.S. PATENT DOCUMENTS

| | | |
|---|---|---|
| 5,953,291 A | 9/1999 | Yasukohchi et al. |
| 6,141,772 A | 10/2000 | Hashimoto |
| 6,198,707 B1 | 3/2001 | Yamamoto |
| 6,347,380 B1 * | 2/2002 | Chang et al. ............... 713/503 |
| 6,594,213 B1 * | 7/2003 | Hayashi .................... 369/47.34 |
| 6,697,432 B2 * | 2/2004 | Yanagihara et al. ... 375/240.26 |

FOREIGN PATENT DOCUMENTS

| | | |
|---|---|---|
| EP | 03161826 | 7/1991 |
| EP | 1102262 A2 | 5/2001 |
| JP | 10-049990 | 2/1998 |
| JP | 10-293961 | 11/1998 |
| JP | 10-302387 | 11/1998 |
| JP | 2000-40302 | 2/2000 |
| WO | WO 92/09074 | 5/1992 |
| WO | WO 00/63897 | 10/2000 |

OTHER PUBLICATIONS

European Search Report dated Apr. 2, 2002.
Burn–Proof brennt ohne Buffer Underrun (1 page).

* cited by examiner

*Primary Examiner*—Gautam R. Patel
(74) *Attorney, Agent, or Firm*—Dickstein Shapiro Morin & Oshinsky LLP

(57) ABSTRACT

An information recording apparatus includes a data writing part that writes data transferred from a host computer onto a data-recordable recording medium, a data writing pause part that pauses writing of the data by the data writing part, a data writing rate change part that changes a writing rate at which the data writing part writes the data, a data writing restart part that restarts the writing of the data, and a data writing control part that controls the data writing pause part, the data writing rate change part, and the data writing restart part.

29 Claims, 8 Drawing Sheets

INFORMATION RECORDING APPARATUS AND METHOD FOR CONTROLLING DATA WRITING RATE BASED ON DATA TRANSFER RATE SO AS TO IMPROVE DATA WRITING PERFORMANCE

BACKGROUND OF THE INVENTION

1. Field of the Invention

The present invention generally relates to information recording apparatuses such as CD-R/RW drives and information recording methods, and more particularly to an information recording apparatus and method that prevents an occurrence of a buffer under-run.

2. Description of the Related Art

Japanese Laid-Open Patent Applications No. 10-293961 and No. 10-302387 each discloses an information recording apparatus that prevents an occurrence of a buffer under-run by adjusting a rate of writing information onto an optical disk through a buffer so that the writing rate is balanced with a rate of transferring data from a host computer to the buffer by controlling the number of rotations of a spindle motor in accordance with the data transfer rate through means for controlling the number of rotations of the spindle motor in accordance with an amount of data stored in the buffer. Here, the buffer under-run refers to an operation of interrupting data writing if the writing rate is higher than the data transfer rate so that the data stored in the buffer runs short and restarting the data writing after a predetermined amount of data is stored in the buffer. In this operation, the data writing is interrupted and restarted so that the continuity of the written data is maintained.

Such an information recording apparatus is capable of preventing the buffer under-run, and further realizes the maximum writing performance since writing is always performed at a rate close to that of transferring data from the host computer to the buffer. However, considering the response characteristic of the spindle motor or laser diode (LD) control, it is not easy to adjust the number of rotations of the spindle motor in accordance with the amount of data stored in the buffer whenever necessary.

That is, in the above-described information recording apparatus, since the spindle motor is slow in responding, the buffer is required to have a large capacity to accommodate a sudden change in the data transfer rate, thus resulting in pushing up the production costs. Further, the information recording apparatus stops a writing operation if a data transfer from the host computer is suspended for a certain period of time.

Moreover, the above-described information recording apparatus, which requires the LD control and an encoder circuit for analog adjustment of the writing rate, cannot be put into practical use with ease.

In order to solve the above-described problems, Japanese Laid-Open Patent applications No. 10-49990 and No. 2000-40302 each discloses an information recording apparatus that prevents an occurrence of a buffer under-run error by pausing writing of data and restarting the writing when the data is stored in the buffer.

Such an information recording apparatus is capable of preventing an occurrence of the buffer under-run error with no problem even if there is a great fluctuation in the rate of transferring data from the host computer or the data transfer is suspended for a certain period of time.

Further, the capacity of the buffer can be kept small since there is no need to take precautions against occurrence of the buffer under-run.

However, under conditions without occurrence of the buffer under-run error, a conventional information recording apparatus such as any of the above-described information recording apparatuses normally performs writing at the maximum writing rate, and repeatedly pauses writing of even a buffer-capacity amount of data, more or less, if the data transfer rate is a little lower. The conventional information recording apparatus has its writing performance deteriorated by overhead needed thereby.

Reduction of the buffer capacity lowers the costs of components of the information recording apparatus, but at the same time, increases the number of times the information recording apparatus pauses writing to deteriorate its writing performance. That is, there is a tradeoff between the cost reduction and the recording performance in the conventional information recording apparatus.

Further, when writing is paused and restarted, a loss of data may be caused depending on control accuracy. This may not lead to a fatal error, but may deteriorate recording quality to some extent compared with writing without pause and restart.

Therefore, some of users in quest of the highest recording quality hate to pause writing.

Furthermore, since the conventional information recording apparatus decreases its writing rate to prevent an occurrence of the buffer under-run, the conventional information recording apparatus has its writing performance all the more deteriorated in the case of a sudden occurrence of the buffer under-run due to heat calibration performed by an HDD or a temporary increase in a load on a CPU caused by another application.

SUMMARY OF THE INVENTION

It is a general object of the present invention to provide an information recording apparatus and method in which the above-described disadvantages are eliminated.

A more specific object of the present invention is to provide an information recording apparatus and method that realize writing performance of minimizing the number of times data writing is paused due to occurrence of a buffer under-run so that a time required for the data writing is also minimized.

The above objects of the present invention are achieved by an information recording apparatus including a data writing part that writes data transferred from a host computer onto a data-recordable recording medium, a data writing pause part that pauses writing of the data by the data writing part, a data writing rate change part that changes a writing rate at which the data writing part writes the data, a data writing restart part that restarts the writing of the data, and a data writing control part that controls the data writing pause part, the data writing rate change part, and the data writing restart part.

According to the above-described information recording apparatus, if a buffer under-run occurs frequently with a writing rate initially set at the time of data writing, the data writing is restarted with the writing rate being reduced. Thereby, the number of times the data writing is paused when the buffer under-run occurs is minimized, and the writing rate is automatically controlled to minimize a time required for the data writing. Therefore, the performance of data recording quality and writing efficiency can be improved without a user performing complicated operations.

The above objects of the present invention are also achieved by an information recording method including the steps of (a) writing data transferred from a host computer onto a data-recordable recording medium, (b) pausing writing of the data by said step (a), (c) changing a writing rate at which said step (a) writes the data so that a number of occurrences of a buffer under-run is reduced, and (d) restarting the writing of the data.

According to the above-described information recording method, the same effects as described above can be produced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of an embodiment of the present invention.

Figure 1:
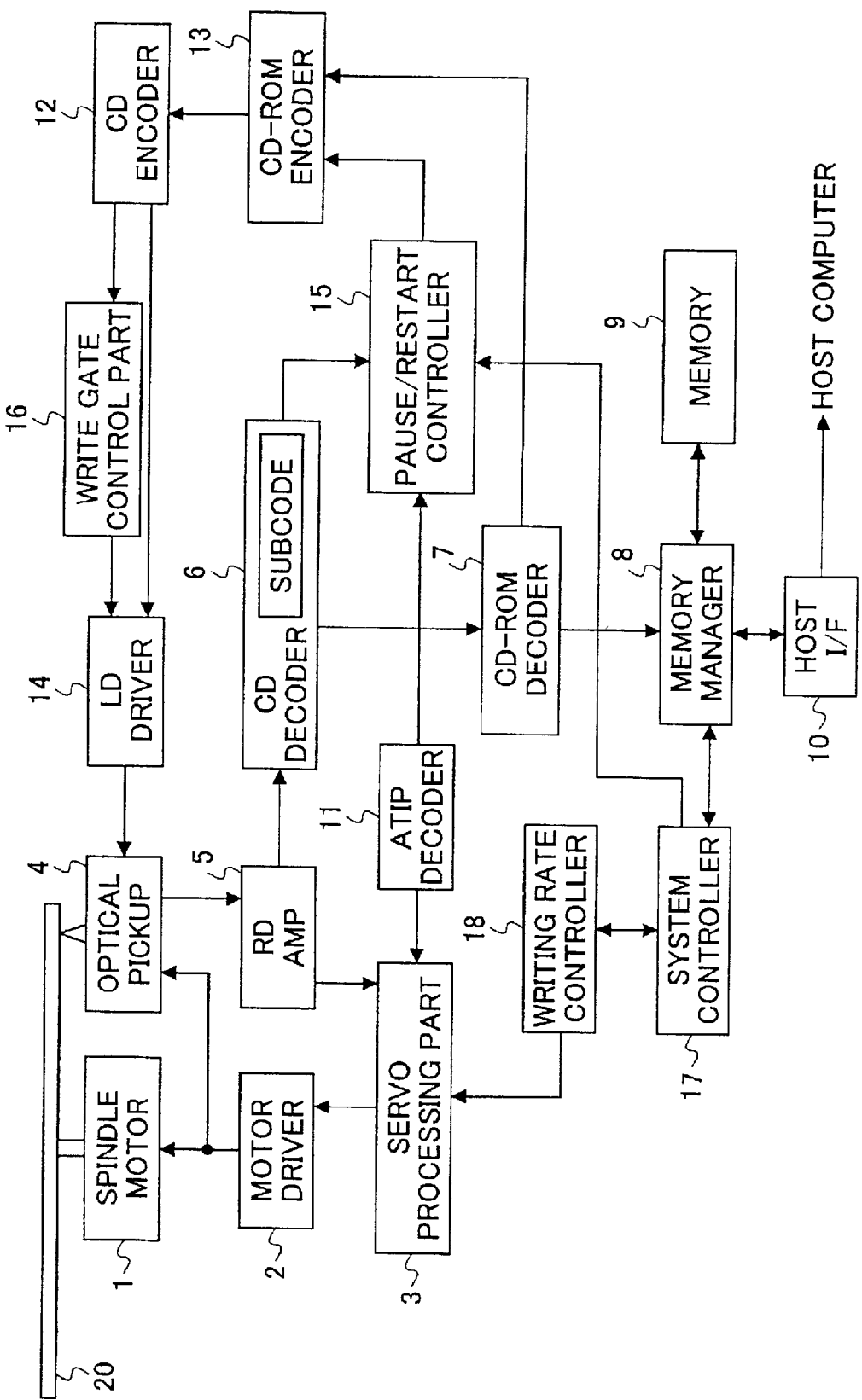
FIG. 1 is a block diagram showing a configuration of a drive unit that is an embodiment of an information recording apparatus according to the present invention.

FIG. 1 is a block diagram showing a configuration of a drive unit that is an embodiment of an information recording apparatus according to the present invention. In the drawing, arrows mainly indicate data flow.

This drive unit is realized by a microcomputer including a CPU, a ROM, and a RAM, and includes below-described components referred to by numerals 1 through 18.

An optical disk 20 is a (data-recordable) recording medium of a direct-read-after-write type, such as a compact disk recordable (CD-R) or a compact disk rewritable (CD-RW) that is rotated by a spindle motor 1.

The spindle motor 1 rotates the optical disk 20 under the rotation control of a motor driver 2 and a servo processing part 3 so that a linear velocity or an angular velocity remains constant at the time of writing or reading data. The linear velocity may be changed step by step.

An optical pickup 4, which includes a semiconductor laser, an optical system, a focus actuator, a tracking actuator, a light-receiving element, and a position sensor (none shown in the drawing), emits a predetermined amount of a laser beam onto the optical disk 20 at the time of writing and reproducing data.

Further, the optical pickup 4 is driven by a seek motor (not shown in the drawing) so as to move over the optical disk 20.

The motor driver 2 and the servo processing part 3 control the focus actuator, the tracking actuator, and the seek motor based on signals received from the light-receiving element and the position sensor so that the laser beam is focused into a spot on a target position on a recording surface of the optical disk 20.

In this drive unit, in the case of reading data (data read), a reproduced signal obtained by the optical pickup 4 is amplified by a read amplifier 5 into binary data, and thereafter, is subjected to deinterleaving and error correction in a CD decoder.

Further, the decoded data is subjected to error correction in a CD-ROM decoder 7 to increase the reliability of the data.

Thereafter, a memory manager (buffer manager) 8 stores the data in a memory 9 such as a buffer RAM, and transmits the data through a host interface (host I/F) 10 to a host computer such as a personal computer every time a sector amount of data is stored.

On the other hand, in the case of writing data (data write or data writing), the memory manager 8 temporarily stores data transmitted from the host computer in the memory.

Thereafter, when a certain amount (predetermined amount) of data is stored in the memory 9, a data write operation is started. Before the start of the data write operation, the laser spot formed by the optical pickup 4 is positioned at a point at which data write is started (a writing start position) on the recording surface of the optical disk 20.

The write start point is determined based on a wobble signal determined by the wobble of tracks preformed on the recording surface of the optical disk 20.

The wobble signal includes absolute time information called ATIP (Absolute Time In Pregroove), and the ATIP information is extracted by an ATIP decoder 11.

The ATIP decoder 11 generates a synchronization signal, which is input through a pause/restart controller 15 and a CD-ROM encoder 13 to a CD encoder 12. Based on the synchronization signal, the CD encoder 12 enables starting data read at an exact position on the recording surface of the optical disk 20.

The CD-ROM encoder 13 and the CD encoder 12 add an error correction code to and perform interleaving on the data stored in the memory 9, and the data is recorded on the recording surface of the optical disk 20 by means of the laser beam controlled by an LD driver 14 and the optical pickup 4.

The pause/restart controller 15 pauses (interrupts or suspends) or restarts the data writing according to the present invention.

In pausing the data writing, when a system controller 17, which manages control of the entire drive unit, transmits a pause command to the pause/restart controller 15, the pause/restart controller 15 causes a write gate control part 16 to negate a write gate at a given position in the next sector and stops the CD encoder 12.

The data in encoding by the CD encoder and a write LD current are maintained.

In the case of restarting the data writing, when the optical pickup is positioned at a target address and the system controller 17 transmits a restart command to the pause/restart controller 15, the data writing is restarted exactly at a position where the data writing is paused.

Then, unlike a normal start of data writing, the pause/restart controller 15 detects the writing start position based on an already written RF signal, a PLL signal synchronizing with the RF signal, sub-codes, and a frame synchronizing signal. Therefore, the pause/restart controller 15 can control the writing start position with remarkably high accuracy so that pausing and restarting the data writing causes no problem in the recorded data in terms of error correction.

A writing rate controller 18 changes (a value or level of) a writing rate according to the present invention, and controls the spindle motor 1, the CD encoder 12, and the LD power of the LD driver 14 in accordance with the writing rate.

In other words, the optical pickup 4 and a system controller 17 function as a data writing part that writes data transferred from the host computer to the optical disk 20 (a data-recordable recording medium).

The pause/restart controller 15 functions as a data writing pause part that pauses data writing performed by the data writing part and a data writing restart part that restarts the data writing after the pause of the data writing made by the data writing pause part with the continuity of the recorded data being maintained.

The writing rate controller 18 functions as a data writing rate change part that changes (a value or level of) a writing rate at the time of the data writing by the data writing part.

The system controller 17, in the case of changing the writing rate by the data writing rate change part, functions as a data writing control part that causes the data writing pause part to pause the data writing, then, the data writing rate change part to change the writing rate, and thereafter, the data writing restart part to restart the data writing.

The system controller 17 also functions as a buffer under-run occurrence count part that counts the number of occurrences of a buffer under-run at the time of the data writing by the data writing part and a writing rate control part that causes the data writing rate change part to change the writing rate based on the number of occurrences of the buffer under-run.

The system controller 17 further functions as a writing rate determination part that determines whether the writing rate is higher or lower than a data transfer rate at which the data is transferred from the host computer and a writing rate control part that causes the data writing rate change part to change the writing rate based on results of a determination made by the writing rate determination part.

The system controller 17 furthermore functions as a data transfer rate determination part that determines the data transfer rate and a writing rate control part that causes the data writing rate change part to change the writing rate based on the data transfer rate determined by the data transfer rate determination part.

Moreover, the system controller 17 functions as a part that causes the data writing part to perform test writing on the optical disk 20 based on test data transferred from the host computer so that an optimized writing rate is obtained and to perform actual data writing at the optimized writing rate.

In addition, the system controller 17 functions as an automatic writing rate change setting part that sets an automatic writing rate change if the host computer authorizes the automatic writing rate change and an enabling part that enables a control operation of the data writing control part if the automatic writing rate change is set in the automatic writing rate change setting part.

Figure 2:
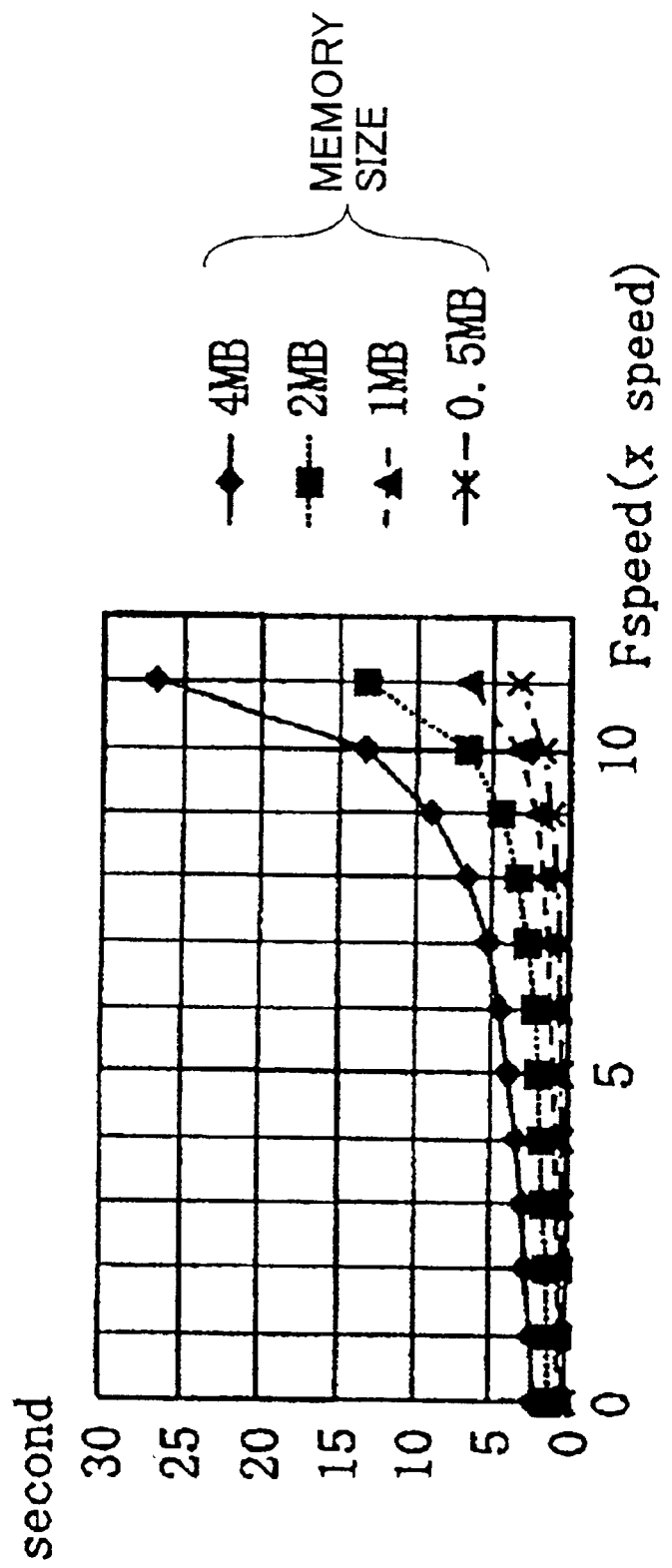
FIG. 2 is a diagram showing in how many seconds a buffer under-run occurs at each data transfer rate for each size of a memory of the drive unit of FIG. 1.

FIG. 2 is a diagram showing, for each size of the memory 9, in how many seconds the buffer under-run occurs at each data transfer rate (Fspeed) expressed in a multiple of the writing rate after the data writing is started at a writing rate of 12× when the memory 9 is filled with the data.

As shown in the drawing, when the data transfer rate is lower than the writing rate, intervals at which the buffer under-run occurs become short sharply as the data transfer rate becomes lower.

In order to prevent the number of occurrences of the buffer under-run from increasing, it is essential to write data at a writing rate lower than the data transfer rate.

As the capacity of the memory 9 is increased, the buffer under-run occurs at longer intervals, that is, the number of occurrences of the buffer under-run is decreased. However, there is a limit to the capacity of the memory 9 physically and in terms of costs, as well. Therefore, it is understood that it is not advisable to decrease the number of occurrences of the buffer under-run by adjusting the size of the capacity of the memory 9.

Next, a description will be given of data recording operations of the drive unit.

Figure 3:
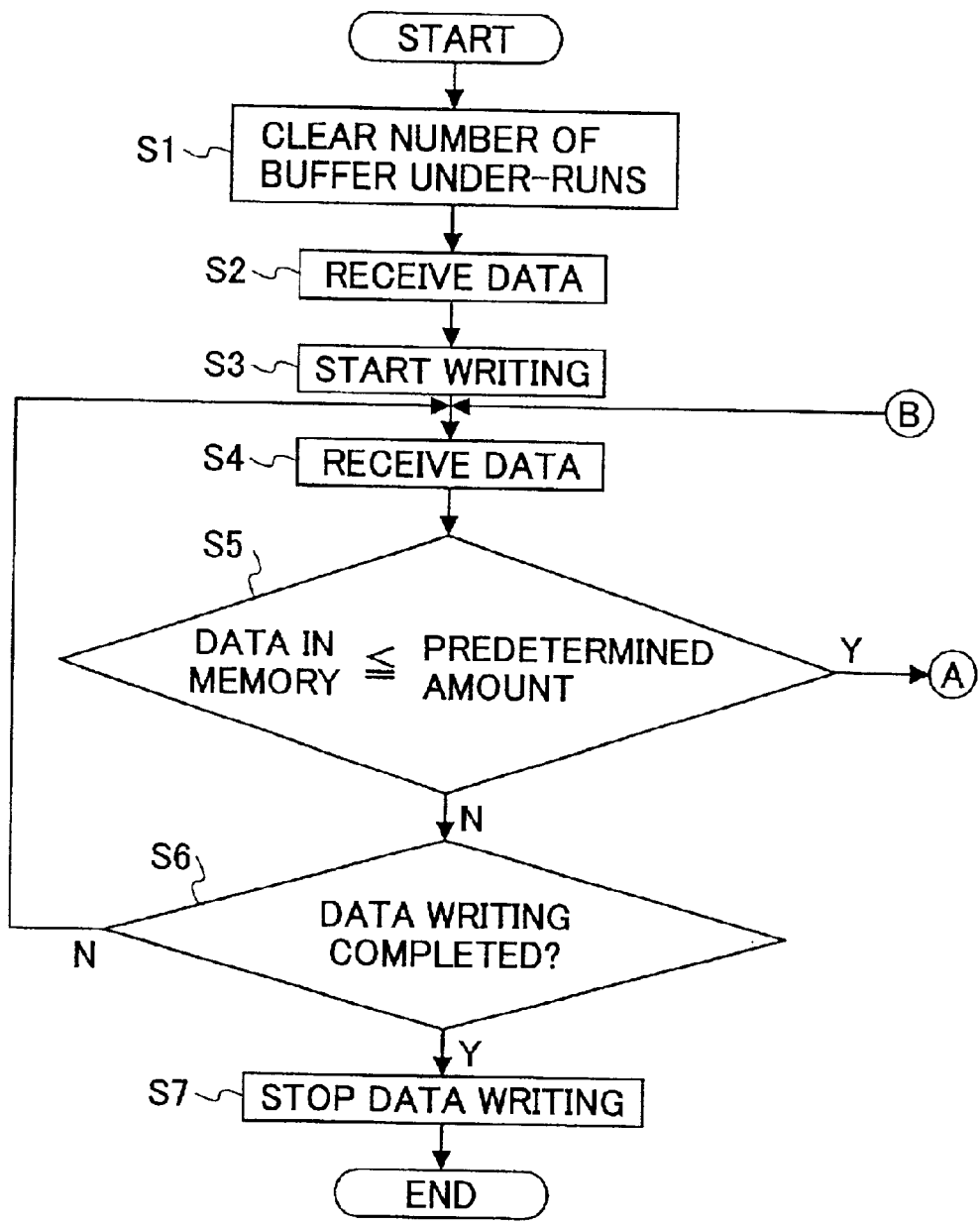
FIG. 3 is a flowchart of a data recording operation of the drive unit.
Figure 4:
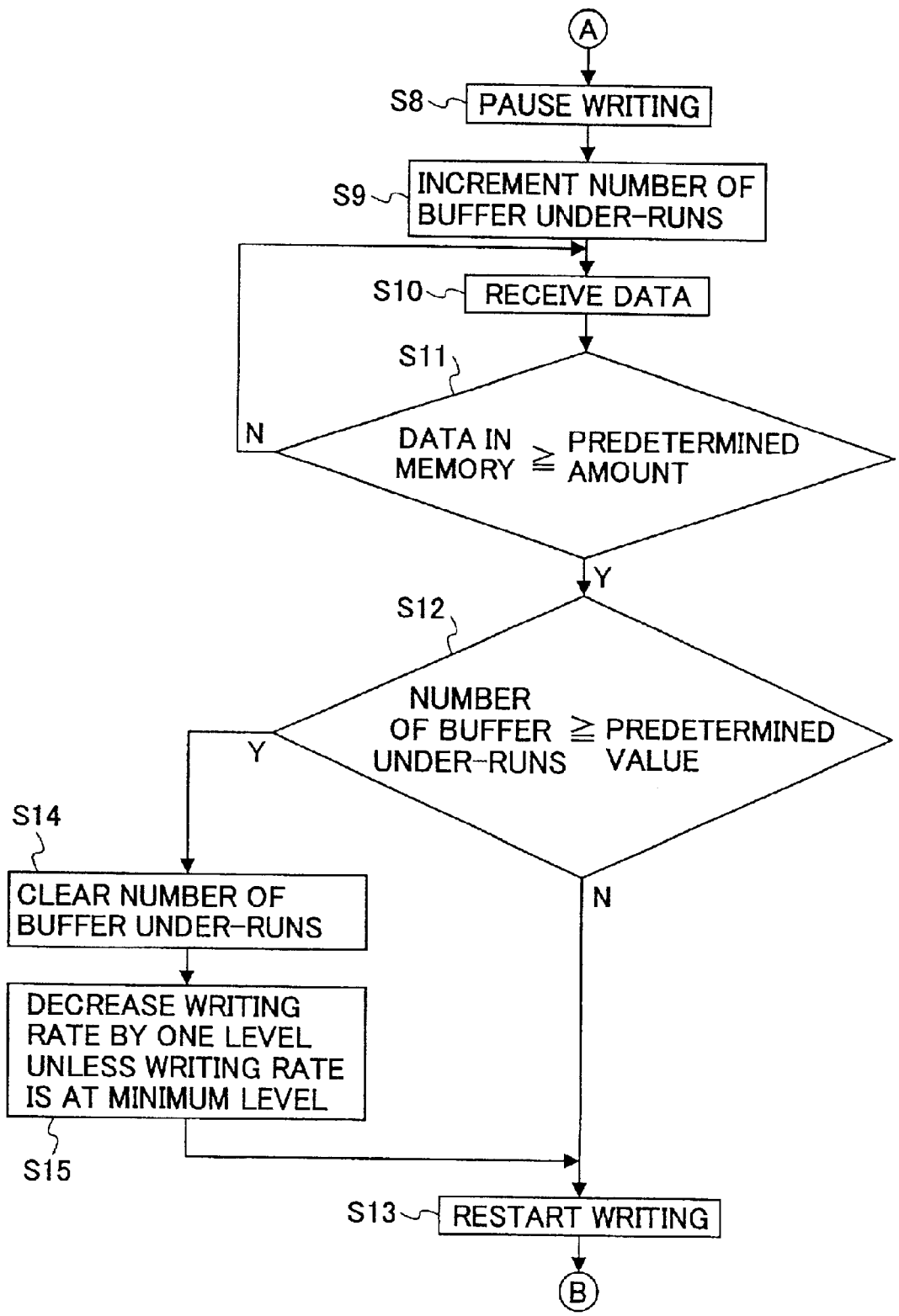
FIG. 4 is a flowchart of the data recording operation of the drive unit.

FIGS. 3 and 4 are flowcharts of a data recording operation of the drive unit of FIG. 1.

At the start of data writing, first, in step S1 of FIG. 3, the system controller 17 clears the number of occurrences of the buffer under-run (or the number of buffer under-runs). Then, in step S2, the system controller 17 receives data to be written to the optical disk 20 (write data) from the host computer, and thereafter, in step S3, starts writing the received data.

While receiving and writing the data in step S4, in step S5, the system controller 17 constantly monitors an amount of data in the memory 9 so as to determine whether the amount of data is smaller than or equal to a predetermined amount. The predetermined amount may be set to five percent of the capacity of the memory 9, for instance.

If it is not determined in step S5 that the amount of data is smaller than or equal to the predetermined amount, it is determined in step S6 whether the data writing ends. If the data writing does not end, the operation goes back to step S4 and the above-described steps are repeated.

If it is determined in step S5 that the amount of data is smaller than or equal to the predetermined amount, the operation proceeds to step S8 of FIG. 4, where the system controller 17 causes the pause/restart controller 15 to pause the data writing.

Then, in step S9, the system controller 17 increments the number of buffer under-runs by "one", and in step S10, the system controller 17 continues receiving the data. In step S11, the system controller 17 determines whether the amount of data in the memory 9 is larger than or equal to a predetermined amount, and if the amount of data is not larger than or equal to the predetermined amount, the operation returns to step S10. That is, in steps S10 and S11, the system controller 17 continues receiving the data until the write data of an amount larger than or equal to the predetermined amount is stored in the memory 9. The predetermined amount may be set to 95 percent of the capacity of the memory 9, for instance.

If the write data of the amount larger than or equal to the predetermined amount is stored in the memory 9 and the system controller 17 determines in step S11 that the amount of data in the memory 9 is larger than or equal to the predetermined amount, the system controller 17 determines in step S12 whether the number of buffer under-runs is larger than or equal to a predetermined value. The predetermined value may be set to five, for instance.

If the system controller 17 determines in step S12 that the number of buffer under-runs is larger than or equal to the predetermined value, the system controller 17 determines that the data transfer rate is lower than the writing rate, and in step S14, clears the number of buffer under-runs. Then, in step S15, the system controller 17 causes the writing rate controller 18 to decrease the writing rate by one level unless the writing rate is currently at a minimum level.

In step S13, the system controller 17 causes the pause/restart controller 15 to restart the data wiring so that the continuity of the recorded data can be maintained. Then, the operation returns to step S4 of FIG. 3, where the system controller 17 receives the data. Thereafter, if the system controller 17 determines in step S5 that the amount of data stored in the memory 9 is not smaller than or equal to the predetermined amount and determines in step S6 that the data writing ends, the operation proceeds to step S7, where the system controller 17 stops the data writing and ends this operation.

Thus, if the buffer under-run occurs frequently with a writing rate initially set at the time of data writing, the data writing is restarted with the writing rate being reduced step by step (level by level). Thereby, the number of times the data writing is paused when the buffer under-run occurs is minimized, and the writing rate is automatically controlled to minimize a time required for the data writing (a writing time). Therefore, the performance of data recording quality and writing efficiency can be improved without a user performing complicated operations.

Figure 5:
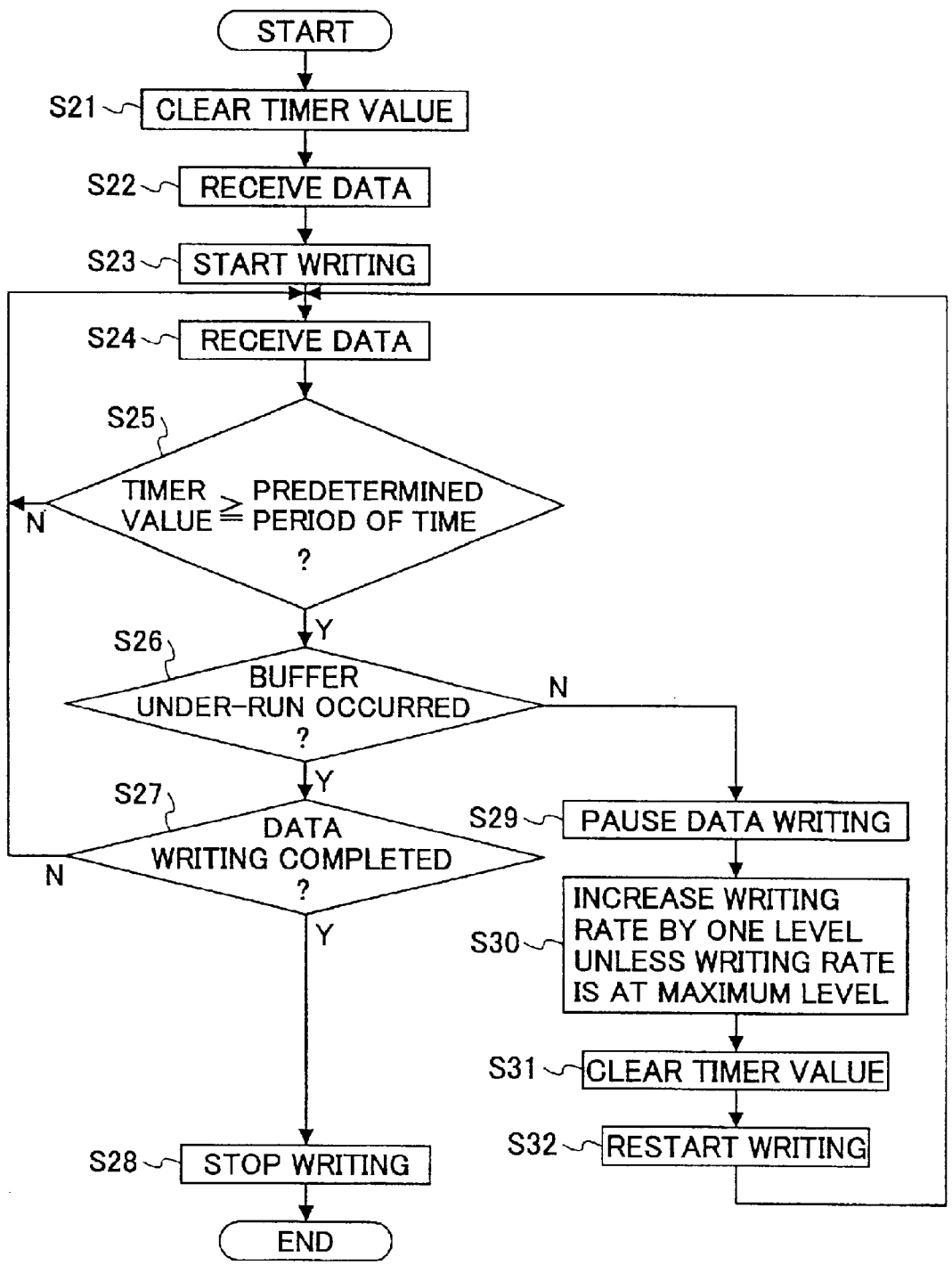
FIG. 5 is a flowchart of another data recording operation of the drive unit.

FIG. 5 is a flowchart of another data recording operation of the drive unit of FIG. 1.

At the start of data writing, first, in step S21 of FIG. 5, the system controller 17 clears a timer value for counting a predetermined period of time. Then, in step S22, the system controller 17 receives data to be written to the optical disk 20 (write data) from the host computer, and thereafter, in step S23, starts writing the received data.

While receiving and writing the data in step S24, in step S25, the system controller 17 continues counting time to determine whether the timer value is greater than or equal to the predetermined period of time. The predetermined period of time is varied in accordance with the writing rate so that the lower the writing rate, the shorter the predetermined period of time.

If the system controller 17 determines in step S25 that the timer value is not greater than or equal to the predetermined period of time, the system controller 17 continues performing step S24 until the timer value is greater than or equal to the predetermined period of time. Then, in step S26, the system controller 17 determines whether the buffer under-run has occurred in the predetermined period of time. If the buffer under-run has occurred in the predetermined period of time, in step S27, the system controller 17 determines whether the data writing ends. If the data writing does not end, the operation returns to step S24 and the above-described steps are repeated.

If the system controller 17 determines in step S26 that the buffer under-run has not occurred in the predetermined period of time, the system controller 17 determines that the data transfer rate is faster than the writing rate, and in step S29, causes the pause/restart controller 15 to pause the data writing. Then, in step S30, the system controller 17 causes the writing rate controller 18 to increase the writing rate by one level unless the writing rate is currently at a maximum level.

In step S31, the system controller 17 clears the timer value, and in step S32, causes the pause/restart controller 15 to restart the data writing so that the continuity of the recorded data can be maintained. Thereafter, the operation returns to step S24, where the system controller 17 receives the data. Then, if the system controller 17 determines in step S25 that the timer value is greater than or equal to the predetermined period of time, in step S26 that the buffer under-run has occurred in the predetermined period of time, and in step S27 that the data writing ends, in step S28, the system controller 17 stops the data writing and ends this operation.

The above-described operation may be realized by counting the number of data-written sectors instead of the predetermined period of time.

Further, the operation of FIG. 5 may be performed in combination with the operation of FIGS. 3 and 4.

That is, the buffer under-run may be prevented from occurring at the time of data writing by increasing the writing rate from its current level (value) by pausing the data writing, increasing the writing rate level by level, and restarting the data writing if the buffer under-run does not occur in a predetermined period of time during the data writing, and by decreasing the writing rate from its current level by pausing the data writing, decreasing the writing rate level by level, and restarting the data writing if the buffer under-run occurs a predetermined period of times or more during the data writing.

Thus, if the buffer under-run does not occur within a predetermined period of time with a writing rate initially set at the time of data writing, the data writing is restarted with the writing rate being increased step by step (level by level). Thereby, the writing rate is automatically controlled to minimize a time required for the data writing without causing the buffer under-run. Therefore, the performance of data recording quality and writing efficiency can be improved without the user performing complicated operations.

Accordingly, the user is free of reduction in the writing rate caused by specifying a writing rate lower than the data transfer rate or by a sudden occurrence of the buffer under-run. Further, the user is capable of automatically improving the data writing performance of the drive unit without knowledge thereof.

Based on occurrence of the buffer under-run, it is only determinable whether or not the writing rate is higher or lower than the data transfer rate. Therefore, it is required to vary the writing rate gradually step by step. However, this all the more increases the number of times data writing is paused, which is not preferable in terms of both writing performance and recording quality.

Therefore, it is desirable to measure a data transfer amount per unit time, determines (calculates) the data transfer rate based on the measured data transfer amount, and change the writing rate directly to an optimum value (level) thereof based on the determined data transfer rate.

Figure 6:
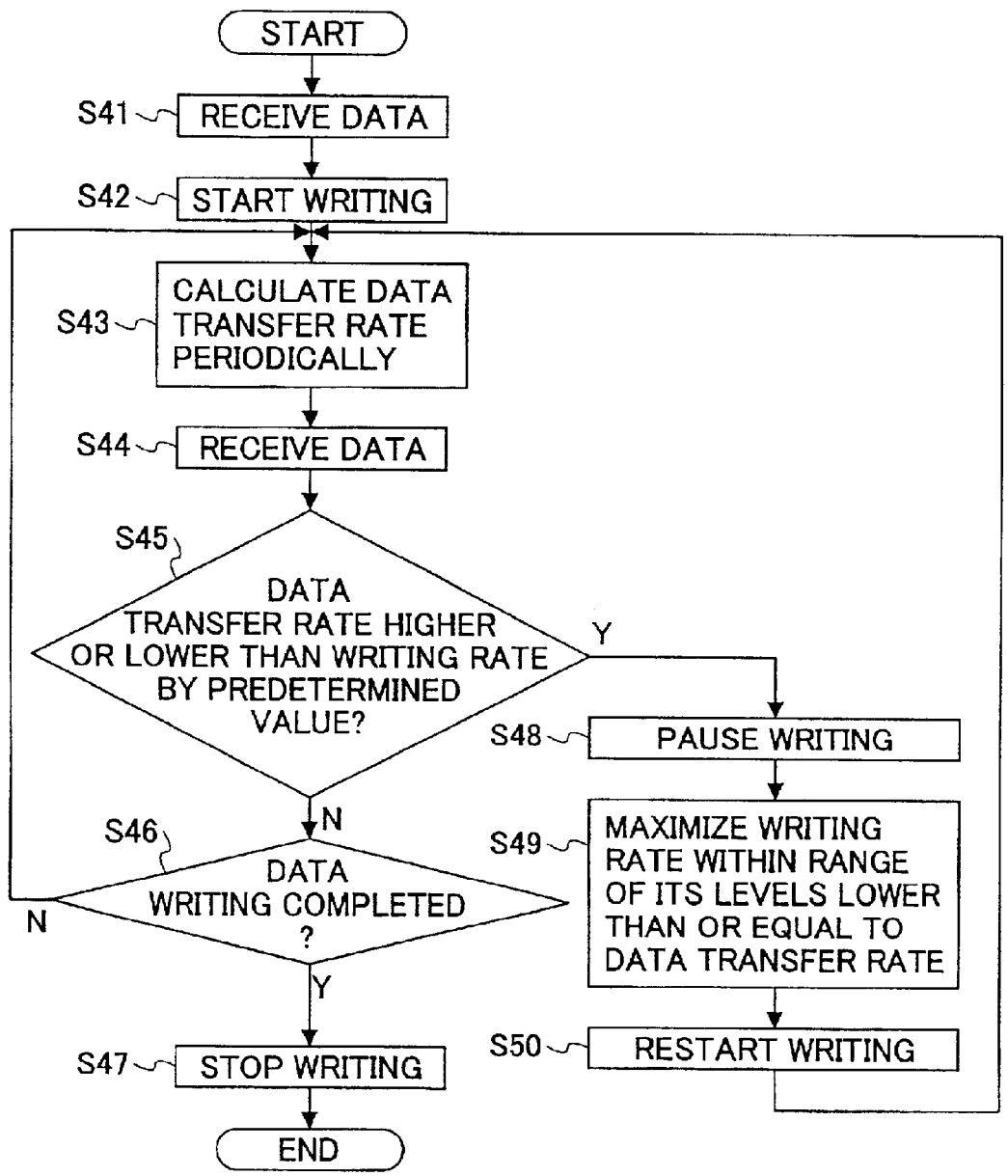
FIG. 6 is a flowchart of yet another data recording operation of the drive unit.

FIG. 6 is a flowchart of another data recording operation of the drive unit of FIG. 1.

At the start of data writing, first, in step S41 of FIG. 6, the system controller 17 receives data to be written to the optical disk 20 from the host computer, and in step S42, starts writing the received data.

After starting the data writing, in step S43, the system controller 17 periodically calculates the data transfer rate at predetermined intervals or at predetermined times, and in step S44, continues receiving the data. Then, in step S45, the system controller 17 determines whether or not the data transfer rate is higher or lower than the writing rate by a predetermined value. The predetermined value may be set to a difference between two adjacent predetermined levels (values) of the writing rate, for instance.

If the system controller 17 determines in step S45 that the data transfer rate is not higher or lower than the writing rate by the predetermined value, the system controller 17 determines in step S46 whether the data writing ends. If the data writing does not end, the operation goes back to step S43 and the above-described steps are repeated.

If the system controller 17 determines in step S45 that the data transfer rate is higher or lower than the writing rate by the predetermined value, in step S48, the system controller 17 causes the pause/restart controller 15 to pause the data writing. Then, in step S49, the system controller 17 causes the writing rate controller 18 to change the writing rate to a value (level) that is lower than or equal to that of the data transfer rate and maximizes the data writing performance of the drive unit. This value (level) may be referred to as an optimum value (level). The system controller 17 sets the writing rate to the optimum value (level).

In step S50, the system controller 17 causes the pause/restart controller 15 to restart the data writing so that the continuity of the recorded data may be maintained. Thereafter, the operation returns to step S43 and the above-described steps are repeated. Then, if the system controller 17 determines in step S45 that the data transfer rate is not higher or lower than the writing rate by the predetermined value and in step S46 that the data writing ends, in step S47, the system controller 17 stops the data writing and ends this operation.

Thus, at the time of writing data, the system controller 17 measures a data transfer amount per unit time, determines (calculates) the data transfer rate based on the data transfer amount, and changes the writing rate directly to an optimum value (level) based on the determined data transfer rate. This prevents an increase in the number of times data writing is paused due to a gradual, step-by-step change in the writing rate, and decreases in the performance and recording quality of the drive unit.

Next, suppose that the user switches off a function of avoiding the buffer under-run in order to avoid a pause in data writing and performs test writing to confirm that the buffer under-run is prevented from occurring with a value (level) of the writing rate set by the user. In such a case, it causes no problem if the buffer under-run does not occur with the maximum value of the writing rate of the drive unit. However, if the buffer under-run occurs or the value of the writing rate set by the user is not the maximum value, the user has to repeat test writing with various values of the writing rate to obtain an optimum value of the writing rate, which costs the user a lot of time and trouble.

Therefore, by automatically obtaining, in test writing performed in the above-described manner, the maximum of such values (levels) of the writing rate at which values the buffer under-run may not occur and by performing actual data writing with the obtained value of the writing rate, the actual data writing is prevented from being paused unless there is a sudden decrease in the data transfer rate.

Figure 7:
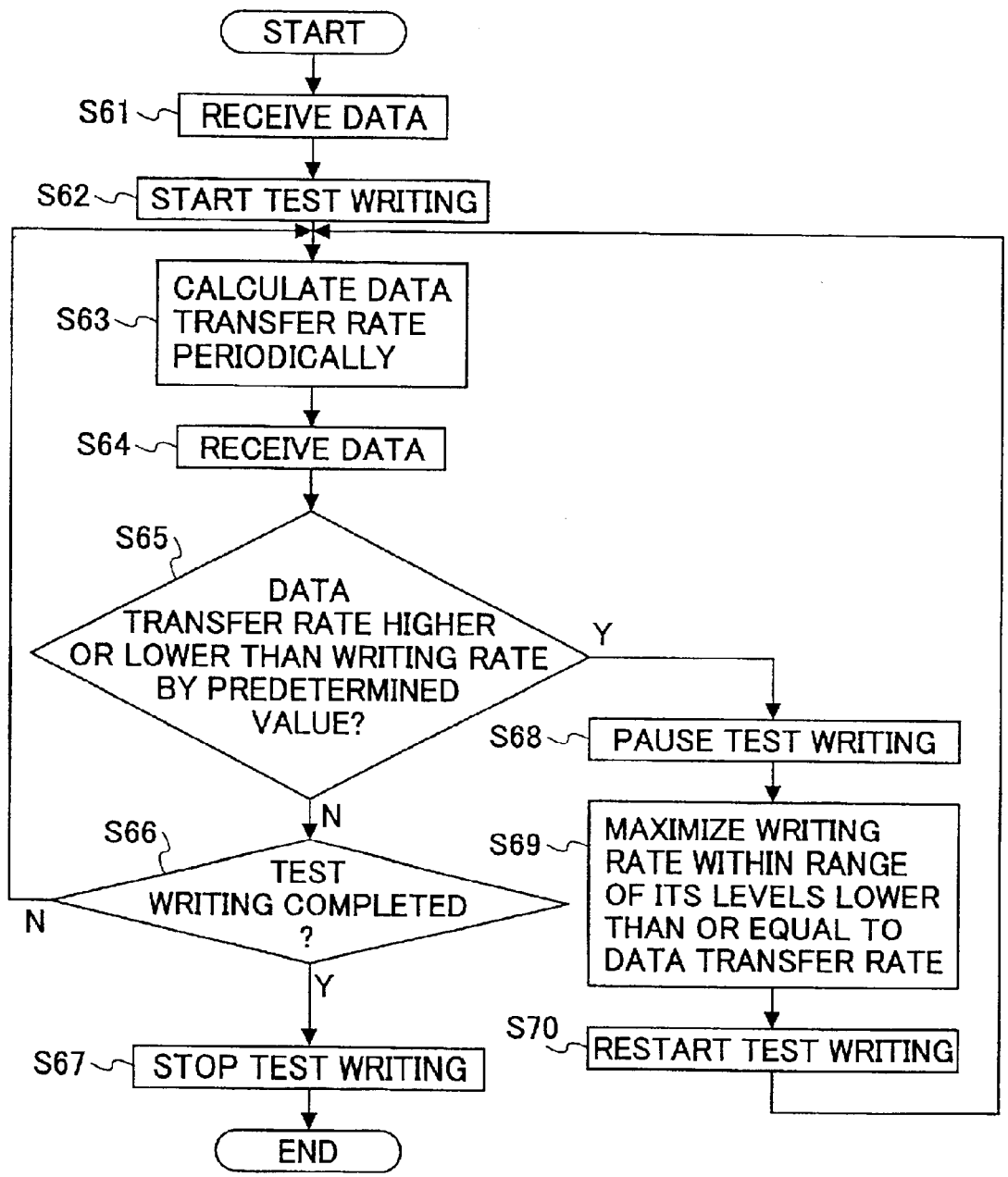
FIG. 7 is a flowchart of yet another data recording operation of the drive unit.

FIG. 7 is a flowchart of another data recording operation of the drive unit of FIG. 1.

In this data recording operation, the above-described operation is performed as a test before data recording, and an optimum writing rate that prevents the buffer under-run from occurring is set before data writing based on the results of the test.

Before writing data, in step S61 of FIG. 7, the system controller 17 receives test data from the host computer, and in step S62, starts writing the test data (test writing).

After the start of the test writing, in step S63, the system controller 17 periodically calculates the data transfer rate at predetermined intervals or predetermined times, and in step S64, continues receiving the data. Then, in step S65, the system controller 17 determines whether or not the data transfer rate is higher or lower than the writing rate by a predetermined value. The predetermined value may be a difference between two adjacent levels (values) of the writing rate of the drive unit.

If the system controller 17 determines in step S65 that the data transfer rate is not higher or lower than the writing rate by a predetermined value, in step S66, the system controller 17 determines whether the test writing ends. If the test writing does not end, the operation returns to step S63 and the above-described steps are repeated.

If the system controller 17 determines in step S65 that the data transfer rate is higher or lower than the writing rate by a predetermined value, in step S68, the system controller 17 causes the pause/restart controller 15 to pause the test writing. Then, in step S69, the system controller 17 causes the writing rate controller 18 to change the writing rate to a value (level) that is lower than or equal to that of the data transfer rate and maximizes the data writing performance of the drive unit. This value (level) may be referred to as an optimum value (level). The system controller 17 sets the writing rate to the optimum value (level).

In step S70, the system controller 17 causes the pause/restart controller 15 to restart the test writing so that the continuity of the recorded data may be maintained. Thereafter, the operation returns to step S63 and the above-described steps are repeated. Then, if the system controller 17 determines in step S65 that the data transfer rate is not higher or lower than the writing rate by the predetermined value and in step S66 that the test writing ends, in step S67, the system controller 17 stops the test writing and ends this operation.

Each of the above-described operations of FIGS. 3 and 4, 5, and 6 may be performed as test writing before data writing.

In the above-described operation, since positioning cannot be performed through the RF signal at the restart of the test writing, the wobble signal is employed instead of the RF signal for positioning.

Thus, the maximum of such values of the writing rate at which values the buffer under-run may not occur is obtained in advance in test writing, and actual data writing is performed with the maximum value of the writing rate. Therefore, in a normal state, data writing can be performed at the maximum value of the writing rate with recording quality being maintained.

Figure 8:
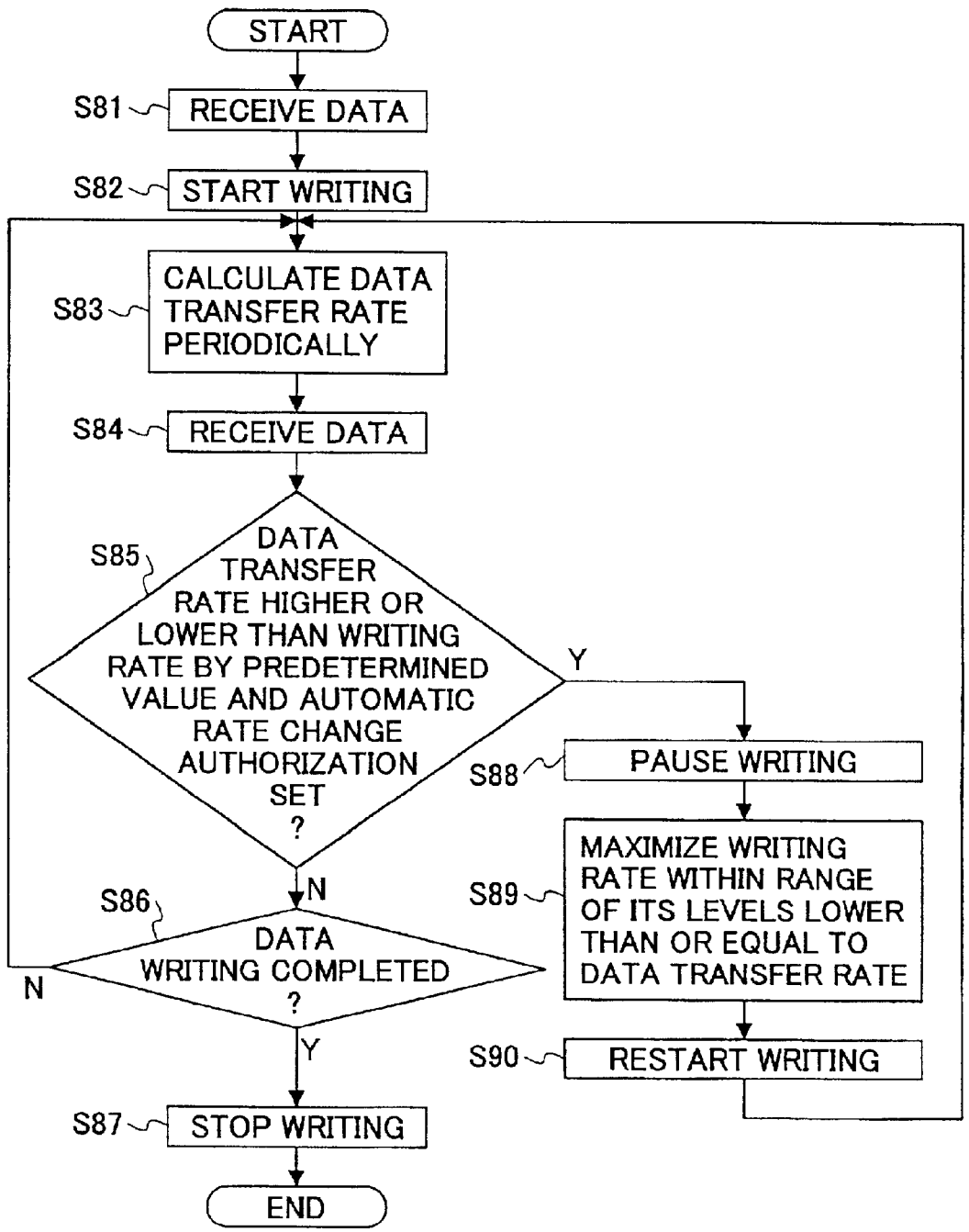
FIG. 8 is a flowchart of yet another data recording operation of the drive unit.

FIG. 8 is a flowchart of another data recording operation of the drive unit of FIG. 1.

In this data recording operation, the above-described data recording operation of FIGS. 3 and 4, FIG. 5, or FIG. 6 is performed only if an authorization to automatically change the writing rate (an automatic rate change authorization) input from the host computer by the user is set. When an automatic rate change authorization instruction is input in advance to the drive unit from the host computer, the system controller 17 of the drive unit stores a setting flag of the automatic rate change authorization in an internal memory (not shown in the drawing) based on the automatic rate change authorization instruction. When the host computer transmits an instruction to cancel the automatic rate change authorization instruction, or if the host computer transmits no automatic rate change authorization instruction, the system controller 17 erases the setting flag in the internal memory.

At the start of data writing, first, in step S81 of FIG. 8, the system controller 17 receives data to be written to the optical disk 20 from the host computer, and in step S82, starts writing the received data.

After starting the data writing, in step S83, the system controller 17 periodically calculates the data transfer rate at predetermined intervals or at predetermined times, and in step S84, continues receiving the data. Then, in step S85, the system controller 17 determines whether or not the data transfer rate is higher or lower than the writing rate by a predetermined value and the automatic rate change authorization is set.

If the system controller 17 determines in step S85 that the data transfer rate is not higher or lower than the writing rate by the predetermined value or the automatic rate change authorization is not set (that is, OFF), the system controller 17 determines in step S86 whether the data writing ends. If the data writing does not end, the operation goes back to step S83 and the above-described steps are repeated.

If the system controller 17 determines in step S85 that the data transfer rate is higher or lower than the writing rate by the predetermined value and the automatic rate change authorization is set (that is, ON), in step S88, the system controller 17 causes the pause/restart controller 15 to pause the data writing. Then, in step S89, the system controller 17 causes the writing rate controller 18 to change the writing rate to a value (level) that is lower than or equal to that of the data transfer rate and maximizes the data writing performance of the drive unit. This value (level) may be referred to as an optimum value (level). The system controller 17 sets the writing rate to the optimum value (level).

In step S90, the system controller 17 causes the pause/restart controller 15 to restart the data writing so that the continuity of the recorded data may be maintained. Thereafter, the operation returns to step S83 and the above-described steps are repeated. Then, if the system controller 17 determines in step S85 that the data transfer rate is not higher or lower than the writing rate by the predetermined value or the automatic rate change authorization is not set, and in step S86 that the data writing ends, in step S87, the system controller 17 stops the data writing and ends this operation.

In each of the above-described data recording operations of FIGS. 3 and 4, 5, and 6, it may also be automatically determined based on the presence or absence of the setting of the automatic rate change authorization whether the writing rate is changed.

If the above-described automatic rate change authorization is set so as to authorize an automatic writing rate change when a certain value of the writing rate, such as "zero", is set, the user is allowed to select any value of the writing rate or an automatic operation from the same menu, which is convenient for the user.

Thus, since the user can predetermine whether to change the writing rate in data writing, a writing time can be minimized by automatically changing the writing rate properly in the case of a normal recording medium. Further, in the case of a recording medium that may have recording quality deteriorated or fringe patterns formed on its recording surface by the change of the writing rate, it is possible to prevent the writing rate from being changed at the time of data writing so as to give preference to recording quality.

The drive unit of this embodiment automatically adjusts the writing rate so as to maximize its data writing performance even if the data transfer rate varies sequentially depending on traffic conditions of a network as in the case of writing data on the network. Therefore, the drive unit saves the user time and effort in selecting a writing rate (a value of the writing rate).

Further, the drive unit can maximize its data writing performance by properly increasing and decreasing the writing rate.

Furthermore, the drive unit can maximize its data writing performance under any conditions by determining whether the buffer under-run occurs suddenly or steadily based on a plurality of occurrences of the buffer under-runs.

Moreover, the drive unit can maintain good data writing performance constantly by eliminating influence of a sudden change in the data transfer rate.

In addition, the drive unit can improve its data writing performance even if the writing rate is initially low.

The drive unit can also decrease the number of times data writing is paused by changing the writing rate directly to an optimum value (level).

The drive unit can lower the probability of occurrence of a pause in actual data writing significantly by performing the actual data writing at an optimum writing rate (an optimum value of the writing rate) selected in test writing.

Since the user can selectively switch on or off the automatic writing rate change function at discretion, the drive unit can safely write data to a recording medium such as an optical disk to which recording medium data can be written only at a specific rate.

The present invention is not limited to the specifically-disclosed embodiment, but variations and modifications may be made without departing from the scope of the present invention.

For instance, in the above-described embodiment, the present invention is applied to the drive unit that writes data to a recording medium such as a CD-R or CD-RW, but the present invention is also applicable to a drive unit that writes data to another recording medium such as a DVD.

The present application is based on Japanese priority patent application No. 2000-353824 filed on Nov. 21, 2000, the entire contents of which are hereby incorporated by reference.

What is claimed is:

1. An information recording apparatus comprising:
    a data writing part that writes data transferred from a host computer onto a data-recordable recording medium;
    a data writing pause part that pauses writing of the data by said data writing part;
    a data writing rate change part that changes a writing rate at which said data writing part writes the data;
    a data writing restart part that restarts the writing of the data; and
    a data writing control part that controls said data writing pause part, said data writing rate change part, and said data writing restart part;
    wherein said data writing control part pauses writing of data by said data writing part when it is determined that data stored in a memory is less than a predetermined amount, said memory storing data to be written by said data writing part before being transferred to said data writing part, and said data writing control part comprises:
        a data transfer rate determination part that determines a data transfer rate at which the data is transferred from the host computer; and
        a writing rate control part that causes said data writing rate change part to change the writing rate based on the data transfer rate determined by said data transfer rate determination part.

2. The information recording apparatus as claimed in claim 1, wherein said data writing control part comprises:
   a buffer under-run occurrence count part that counts a number of occurrences of a buffer under-run; and
   a writing rate control part that causes said data writing rate change part to change the writing rate based on the number of occurrences of the buffer under-run.

3. The information recording apparatus as claimed in claim 2, wherein said writing rate control part causes said data writing rate change part to reduce the writing rate if the number of occurrences of the buffer under-run is larger than or equal to a predetermined value.

4. The information recording apparatus as claimed in claim 2, wherein said writing rate control part causes said data writing rate change part to increase the writing rate if the number of occurrences of the buffer under-run counted within a predetermined period of time is zero.

5. The information recording apparatus as claimed in claim 1, wherein said data writing control part comprises:
   a writing rate determination part that determines whether the writing rate is higher or lower than a data transfer rate at which the data is transferred from the host computer; and
   a writing rate control part that causes said data writing rate change part to change the writing rate based on results of a determination made by said writing rate determination part.

6. The information recording apparatus as claimed in claim 5, wherein said writing rate control part causes said data writing rate change part to reduce the writing rate if said writing rate determination part determines that the writing rate is higher than the data transfer rate.

7. The information recording apparatus as claimed in claim 5, wherein said writing rate control part causes said data writing rate change part to increase the writing rate if said writing rate determination part determines that the writing rate is lower than the data transfer rate.

8. The information recording apparatus as claimed in claim 5, wherein:
   said data writing control part further comprises a buffer under-run occurrence count part that counts a number of occurrences of a buffer under-run; and
   said writing rate determination part determines that the writing rate is higher than the data transfer rate if the number of occurrences of the buffer under-run is larger than or equal to a predetermined value and that the writing rate is lower than the data transfer rate if the number of occurrences of the buffer under-run counted within a predetermined period of time is zero.

9. The information recording apparatus as claimed in claim 1, wherein said writing rate control part causes said data writing rate change part to change the writing rate so that data writing performance of the information recording apparatus is maximized.

10. The information recording apparatus as claimed in claim 1, wherein said writing rate control part causes said data writing rate change part to change the writing rate if the data transfer rate is higher or lower than the writing rate by a predetermined value.

11. The information recording apparatus as claimed in claim 1, wherein the predetermined value is a difference between two adjacent predetermined levels of the writing rate.

12. The information recording apparatus as claimed in claim 1, wherein said writing rate control part causes said data writing rate change part to optimize the writing rate so that the optimized writing rate is lower than or equal to the data transfer rate.

13. The information recording apparatus as claimed in claim 12, wherein said data writing control part further comprises a part that causes said data writing part to perform test writing on the recording medium based on test data transferred from the host computer so that the optimized writing rate is obtained and to perform actual data writing at the optimized writing rate.

14. The information recording apparatus as claimed in claim 1, further comprising:
   an automatic writing rate change setting part that sets an automatic change of the writing rate if the host computer authorizes the automatic change of the writing rate; and
   an enabling part that enables a control operation of said data writing control part if the automatic change of the writing rate is set in said automatic writing rate change setting part.

15. An information recording method comprising the steps of:
   (a) writing data transferred from a host computer onto a data-recordable recording medium;
   (b) pausing writing of the data by said step (a) to prevent a buffer under-run recording error on said recording medium;
   (c) changing a writing rate at which said step (a) writes the data so that a number of occurrences of a buffer under-run is reduced;
   (d) restarting the writing of the data; and
   (e) determining a data transfer rate at which the data is transferred from the host computer;
   wherein said step (c) changes the writing rate based on the data transfer rate determined by said step (e).

16. The information recording method as claimed in claim 15, further comprising the step of (e) counting the number of occurrences of the buffer under-run,
   wherein said step (c) changes the writing rate based on the number of occurrences of the buffer under-run counted by said step (e).

17. The information recording method as claimed in claim 16, wherein said step (c) reduces the writing rate if the number of occurrences of the buffer under-run is larger than or equal to a predetermined value.

18. The information recording method as claimed in claim 16, wherein said step (c) increases the writing rate if the number of occurrences of the buffer under-run counted within a predetermined period of time is zero.

19. The information recording method as claimed in claim 15, further comprising the step of (e) determining whether the writing rate is higher or lower than a data transfer rate at which the data is transferred from the host computer,
   wherein said step (c) changes the writing rate based on results of a determination made by said step (e).

20. The information recording method as claimed in claim 19, wherein said step (c) reduces the writing rate if said step (e) determines that the writing rate is higher than the data transfer rate.

21. The information recording method as claimed in claim 19, wherein said step (c) increases the writing rate if said step (e) determines that the writing rate is lower than the data transfer rate.

22. The information recording method as claimed in claim 19, further comprising the step of (f) counting the number of occurrences of the buffer under-run, wherein said step (e) determines that the writing rate is higher than the data transfer rate if the number of occurrences of the buffer under-run counted by said step (f) is larger than or equal to a predetermined value and that the writing rate is lower than the data transfer rate if the number of occurrences of the buffer under-run counted within a predetermined period of time is zero.

23. The information recording method as claimed in claim 19, further comprising the step of (f) determining whether an amount of the data stored in a memory is larger than or equal to a predetermined amount, wherein said step (e) is performed if said step (f) determines that the amount of the data is larger than or equal to the predetermined amount.

24. The information recording method as claimed in claim 15, wherein said step (c) changes the writing rate so that data writing performance is maximized.

25. The information recording method as claimed in claim 15, wherein said step (c) changes the writing rate if the data transfer rate is higher or lower than the writing rate by a predetermined value.

26. The information recording method as claimed in claim 25, wherein the predetermined value is a difference between two adjacent predetermined levels of the writing rate.

27. The information recording method as claimed in claim 15, wherein said step (c) optimizes the writing rate so that the optimized writing rate is lower than or equal to the data transfer rate.

28. The information recording method as claimed in claim 27, wherein:

said steps (a) through (e) are performed as test writing so as to obtain the optimized writing rate; and actual data writing is performed at the optimized writing rate.

29. The information recording method as claimed in claim 15, further comprising the steps of:

(e) setting an automatic change of the writing rate if the host computer authorizes the automatic change of the writing rate; and (f) enabling said steps (b) through (d) if the automatic change of the writing rate is set by said step (e).

* * * * *